Patented Feb. 26, 1952

2,586,770

UNITED STATES PATENT OFFICE 2,586,770

STABLE COMBINATION OF CATION- AND ANION-EXCHANGE RESINS

Alexander V. Alm, Stamford, Conn., assignor to American Cyanamid Company, New York, N. Y., a corporation of Maine No Drawing. Application June 2, 1947, Serial No. 752,006

3 Claims. (Cl. 260—42)

This invention relates to ion exchange materials and more particularly, to stable combinations of cation and anion exchange materials.

Ion exchange as a method by which ionizable solids may be removed from liquid media is known. Among the first developments in the field was the use of a single bed of a cation active zeolite to soften water by replacing the metallic ions lending hardness thereto with sodium ions. It was later found expedient to use two beds of ion active material, one cation active and one anion active, in series and thus remove both cations and anions from liquid media. A most effective and efficient demineralization process has as one of its important features the use of a plurality of pairs of cation and anion exchangers.

The use of a single bed of mixed cation and anion exchange materials in place of separate alternate beds thereof has also been described. Many advantages may be attained by the use of mixed cation and anion exchange materials. In the first place, such a mixture often gives more efficient and more complete demineralization. Secondly, it permits the use of conventional types of equipment for liquid demineralization since it does not require any special equipment. As a result, mixed resins are useful in commercial installations either in the form of beds or as filter coatings and either in batch processes or in continuous processes.

Development in the field of liquid treatment by ion exchange processes has proceeded along another line simultaneously with that of the increased use of mixed ion exchange materials. Since purification of water or, in general, removal of ionizable solids from liquid media by means of a multi-bed system involves the use of heavy equipment including metallic, porcelain, or wooden tanks of considerable size, and because of the heavy demand for a highly purified water of a quality comparable to distilled water in many places where stills are not available or where it would be difficult to transport the stills and equipment normally used in purifying water by means of ion exchange materials, a lightweight portable water purification unit has seemed desirable, particularly for use in connection with military operations. As a result, disposable, portable cartridges containing alternate beds of anion and cation exchange materials have been developed. The next step in the development was the packing of mixed ion exchange materials instead of alternate beds of such materials in disposable cartridges.

One outstanding disadvantage in the use of mixed resins whether they be part of a commercial installation or in a portable, disposable cartridge of one sort or another lies in the excessive waste material originally considered necessarily inherent in processes using mixtures. The resins had to be discarded after they once became exhausted, and in view of the relatively high cost of ion exchange resins this procedure was not practical. This disadvantage has been overcome by the development of various processes for separating one resin from another in admixture.

Another and more critical disadvantage in the use of mixed resins is the instability of mixtures of most of the cation and anion exchange materials known at the present time. Apparently upon combining the two types of materials slight decomposition and a sort of neutralization of the effect of one by the other occurs since the capacity for the removal of ions from liquid media drops considerably in most cases after only a short time of contact.

It is an object of the present invention to provide a combination of anion and cation exchange materials which is stable over a period of time.

Another object of the present invention is to provide a stable combination of anion and cation exchange materials which has a shelf life of at least 24 weeks.

The above and other objects are attained by providing for liquid purification by ion exchange a combination of an anion active resin which is the reaction product of an alpha-chloro-beta,gamma-epoxy compound and at least one alkylene polyamine in the ratio of at least two mols of epoxy compound per mole of polyamine with a cation active resin which is an alpha-furyl substituted organic sulfonate reacted with and insolubilized by an aldehyde.

The invention will be described in greater detail in conjunction with the following specific example which is merely illustrative and not intended to be restrictive of the scope of the invention.

Example

A series of cylindrical containers about 16 inches long and about 3 inches in diameter which are made of cardboard lined with metal foil and coated with asphaltum or other water proofing material are provided with a liquid inlet at the bottom of the container and a liquid outlet at the top of the container. These may consist simply of a cork through which extends a glass tube onto which is attached rubber tubing.

The containers or cartridges are all packed in an identical manner with a mixture of an activated and rinsed granular cation active resin prepared according to Example 5 of U. S. Patent No. 2,327,233, and an activated and rinsed anion resin "A" prepared as described in detail below, said mixtures containing the cation and anion resins in a 1:1 proportion by volume. In order to determine the initial capacity of the particular mixture a single cartridge is exhausted by water containing 125 p. p. m. (parts per million) of sodium, 125 p. p. m. of chloride, a calcium hardness of 123 p. p. m. and a bicarbonate alkalinity of 130 p. p. m., all quantities figured as calcium carbonate. The resin mixture is found to have an initial capacity of 15.3 kilograins as calcium carbonate per cubic foot of cation resin, as determined from the following data:

| Liters through— | Specific resistance at 20° C. in ohms | Properties of Effluent | | | | |
|---|---|---|---|---|---|---|
| | | FMA (Free Mineral Acidity) as p. p. m. | Na as p. p. m. | $CO_2$ as p. p. m. | Hardness as p. p. m. | pH |
| 3 | 3,600,000 | 0 | 1 | 0 | 1.5 | 7.8 |
| 30 | 9,600,000 | 0 | 0 | 0 | 0 | 6.95 |
| 48 | >10,000,000 | 0 | 0 | 0 | 0 | 6.9 |
| 66 | >10,000,000 | 0 | 0 | 0 | 0 | 6.8 |
| 84 | >10,000,000 | 0 | 0 | 0 | 0 | 6.1 |
| 102 | 2,750,000 | 0 | 0 | 0 | 0 | 6.9 |
| 120 | 195,000 | 0 | 0 | 23 | 2 | 4.9 |
| 138 | 85,300 | 0 | 0 | 85 | 4 | 4.7 |
| 156 | 60,000 | 0 | 0.5 | 165 | 3.5 | 4.55 |
| 165 | 50,000 | 0 | 1 | 210 | 5 | 4.45 |

The remaining cartridges are exhausted in a similar manner, one at a time, at regular intervals. After 34 weeks, the final cartridge, upon being exhausted by water containing 130 p. p. m. as calcium carbonate each of sodium, chloride, calcium, and bicarbonate, is found from the following data to have a capacity of 8.4 kilograins as calcium carbonate per cubic foot of cation resin.

| Liters through— | Specific resistance at 20° C. in ohms | Properties of Effluent | | | | |
|---|---|---|---|---|---|---|
| | | FMA as p. p. m. | Na as p. p. m. | $CO_2$ as p. p. m. | Hardness as p. p. m. | pH |
| 0 | 5,300 | 2 | 0 | 29 | 0 | 4.1 |
| 33 | 218,000 | 0 | 0 | 5 | 0 | 5.0 |
| 69 | 63,000 | 0 | 0 | 143 | 0 | 4.5 |
| 87 | 49,000 | 0 | 0 | 269 | 0 | 4.4 |

The present invention is not limited to the combination of the particular anion and cation resins only in the 1:1 proportion by volume of the example. In general, I prefer mixing the resins in a proportion of 1:1 by volume but I have found that this proportion can be varied from 3:1, cation:anion, to 1:3, cation:anion, all proportions being expressed in parts by volume, depending upon the particular influent, its rate of flow and the effluent desired.

*Preparation of resin "A"*

203 parts of tetraethylene pentamine (1:1 mols)
297 parts of epichlorohydrin (3.2 mols)
500 parts of water The tetraethylene pentaime is charged into a suitable reaction vessel provided with an agitator and a means for cooling the vessel. The water is added to the tetraethylene pentamine, the resulting solution is cooled to about 44°–47° C., and the epichlorohydrin is added slowly while the reacting mixture is being continuously agitated and kept at a temperature between 44°–47° C. After all the epichlorohydrin has been added the resulting syrup is maintained at a temperature of about 50° C. for about 8 hours.

The gelled syrup is then heated or cured at a temperature of about 95°–105° C. for 17–18 hours. The cured resin is ground and the ground material set aside for use in the resinous mixtures of the present invention.

The present invention is not limited to the particular resins described in the example. Any granular water-insoluble resinous reaction product of an alpha-chloro-beta,gamma-epoxy compound and an alkylene polyamine in the molar ratio of at least 2:1 may be used in place of resin "A" of the example. Further details of this general type of anion active resin may be found in the copending application of James R. Dudley and Lennart A. Lundberg, Serial No. 616,644, filed September 15, 1945, now Patent No. 2,469,683, issued May 10, 1949.

According to the Dudley and Lundberg application identified above, mixtures of two, three, four, five, seven or any other number of polyamines may be employed.

Examples of suitable polyamines include 1,3-diaminopropane, 1,4-diamino-n-butane, 1,3-diamino-n-butane, 1,5-diamino-n-pentane, 1,6-diamino-n-hexane, 1,10-diamino-n-decane, 1,6-diamino-3 methyl-n-hexane, 3,3'-diamino dipropyl ether, and other similar diamines containing hetero atoms in the chains separating the amino groups, triethylene tetramine, pentaethylene hexamine and all of the higher homologs thereof containing additional —$CH_2CH_2NH$— groups in the chain between the primary amino groups etc. Complex mixtures of polyethylene polyamines of high molecular weight obtained by the addition of large numbers of molecules of ammonia to ethylene dibromide or ethylene dichloride and the like may be used.

It is essential that the molar ratio of epichlorohydrin to the polyamine be at least about 2:1 when the two substances are brought together in order to obtain insoluble resins. There is no maximum amount of epichlorohydrin which may be used but generally it should not exceed a molar ratio of 5:1 or with polyamines having more than five amino groups the ratio should not be greater than 1 mol of epichlorohydrin for each amino group in the polyamine.

Instead of epichlorohydrin other substances having an alpha-chloro-beta,gamma-epoxy arrangement are suitable for reaction with polyamines to produce anion active resins. Among these some examples are:

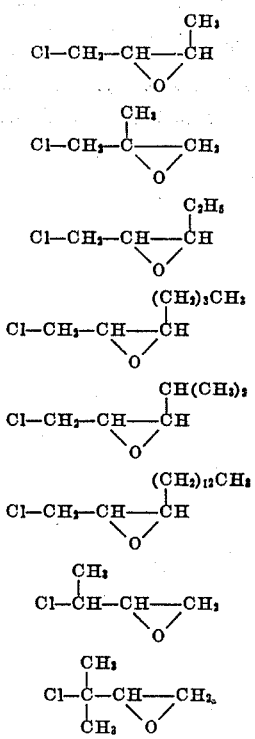

Similarly, while the cation active resin of the example is that prepared according to the details of Example 5 of the U. S. Patent No. 2,372,233, other alpha-furyl substituted organic sulfonates reacted with and insolubilized by aldehydes such as described in the afore-mentioned patent may be substituted therefor.

The cation active resin may be activated by treatment with dilute acid solutions, e. g., 0.1–10% of hydrochloric acid, sulfuric acid, etc., followed by washing of the material with water to remove free acid.

The anion active material may be activated by treatment with a dilute solution of an alkaline material, e. g., 0.1–25% solution of sodium hydroxide, sodium carbonate, by corresponding potassium salts, etc.

The resin combination of the present invention may be used in a large household or industrial liquid purification installation or it may be used in a disposable cartridge. In either case the resin combination may take the form of a homogeneous mixture of the two types of resin or it may consist of alternate layers of any desired thickness of anion active resin and cation active resin packed tightly enough to prevent undue mixing of the two types of resin. Thus, my resin combination is one comprising anion active resin and cation active resin in which at least some of the anion active resin particles are in direct contact with at least some of the cation active resin particles. Whenever referred to in the present specification as "resin combination," this meaning is intended.

In the present specification and claims appended thereto, the term "shelf life" is intended to indicate the stability upon standing (for example, on the shelf of a supplier) of a combination of resins. If, after at least 24 weeks the resin combination has a capacity for the removal of ionizable solids from liquid media of at least 7 kilograins as calcium carbonate per cubic foot of cation resin, then the resin combination is said to have a satisfactory shelf life or a shelf life of at least 24 weeks.

The term "ionizable solids" or "ionizable materials" is intended to include both volatile and non-volatile materials. The major proportion of these solids are inorganic, but some organic substances may be included. These ionizable solids are impurities in the sense that they are not desired in admixture in the fluid to be purified but they may in themselves be valuable or desirable materials.

The capacity of the resin combination is calculated in the following manner from the experimental data given in the examples. It has been found that water having a resistance of 50,000 ohms or higher is generally of satisfactory purity. Accordingly, the measurement of the specific resistance of effluent over a period of time will indicate the point at which the water is no longer of the desired degree of purity, i. e., the point at which the resistance drops below 50,000 ohms. Knowing how much water has flowed through the resin combination, it is possible to calculate the number of gallons of good water which were prepared before exhausting the resins. The number of grains of ionizable solids as calcium carbonate per gallon of influent is known and, by multiplying the total number of gallons of good water by the number of grains of ionizable solids per gallon of influent, it is possible to determine the number of grains of ionizable solids removed by the resin combination from the water which passed through. This figure is converted to grains per cubic foot of cation resin by multiplying it by 28.3 which is equal to the number of liters in a cubic foot, and dividing by the number of liters of cation resin. Division of the figure so obtained by 1,000 gives the capacity of the resin combination in kilograins as calcium carbonate per cubic foot of cation resin. This method may be summarized by the following working equation:

$$\text{Capacity (kilograins as CaCO}_3\text{/ft.}^3 \text{ of cation resin)} = \frac{1}{1000}\left(\text{gallons of good water} \times \text{grains as CaCO}_3 \text{ of influent} \times \frac{\text{liters in ft.}^3}{\text{liters of cation resin}}\right)$$

This is a continuation-in-part of my copending application Serial No. 688,708, filed August 6, 1946, now abandoned.

I claim:

1. A combination of an anion active, granular, water-insoluble, resinous reaction product of epichlorohydrin and an alkylene polyamine in the ratio of at least two mols of epichlorohydrin per mol of polyamine and a cation active granular, water-insoluble, resin which is an alpha-furyl substituted organic sulfonate reacted with and insolubilized by an aldehyde, said combination after standing for at least 24 weeks having a capacity for the removal of ionizable solids from liquid media of at least 7 kilograms as calcium carbonate per cubic foot of cation resin.

2. A combination as in claim 1 which contains the anion and cation active resins in substantially equal proportions by volume.

3. A combination of substantially equal proportions by volume of an anion active granular, water-insoluble, resinous reaction product of epichlorohydrin and tetraethylenepentamine in the ratio of 3 mols of epichlorohydrin per mol of tetraethylene pentamine and a cation active granular, water-insoluble, resinous reaction product of furfural and furfuryl acetone sulfonate, said combination after standing for 34 weeks having a capacity for the removal of ionizable solids from aqueous solution of about 8 kilograins as calcium carbonate per cubic foot of cation resin.

ALEXANDER V. ALM.

REFERENCES CITED

The following references are of record in the file of this patent:

UNITED STATES PATENTS

| Number | Name | Date |
|---|---|---|
| 576,452 | Hart | Feb. 2, 1897 |
| 2,372,233 | Thurston | Mar. 27, 1944 |
| 2,404,367 | Durant et al. | July 23, 1946 |
| 2,451,272 | Blann | Oct. 12, 1948 |
| 2,461,505 | Daniel | Feb. 15, 1949 |
| 2,469,683 | Dudley et al. | May 10, 1949 |
| 2,474,322 | Quinn | June 28, 1949 |

OTHER REFERENCES

Serial No. 359,575, Smit (A. P. C.), published May 11, 1943.